(12) United States Patent
Eimeke et al.

(10) Patent No.: US 9,174,373 B2
(45) Date of Patent: Nov. 3, 2015

(54) HOT CHANNEL DISTRIBUTOR ARRANGEMENT FOR A HOT CHANNEL SYSTEM

(71) Applicant: EWIKON HEISSKANALSYSTEME GMBH, Frankenberg (DE)

(72) Inventors: Stefan Eimeke, Frankenberg (DE); Henk Jan Pomstra, Duiven (NL)

(73) Assignee: EWIKON HEISSKANALSYSTEME GMBH, Frankenberg (DE)

( * ) Notice: Subject to any disclaimer, the term of this patent is extended or adjusted under 35 U.S.C. 154(b) by 0 days.

(21) Appl. No.: 14/363,152

(22) PCT Filed: Dec. 3, 2012

(86) PCT No.: PCT/EP2012/074285
§ 371 (c)(1),
(2) Date: Jun. 5, 2014

(87) PCT Pub. No.: WO2013/083533
PCT Pub. Date: Jun. 13, 2013

(65) Prior Publication Data
US 2015/0050383 A1    Feb. 19, 2015

(30) Foreign Application Priority Data
Dec. 5, 2011    (DE) .......................... 10 2011 056 060

(51) Int. Cl.
*B29C 45/22* (2006.01)
*B29C 45/27* (2006.01)
*B29C 45/26* (2006.01)

(52) U.S. Cl.
CPC ......... *B29C 45/2738* (2013.01); *B29C 45/2727* (2013.01); *B29C 2045/2683* (2013.01); *B29C 2045/2717* (2013.01); *B29C 2045/2729* (2013.01)

(58) Field of Classification Search
CPC .................................................. B29C 45/2725
USPC .......................................................... 425/572
See application file for complete search history.

(56) References Cited

U.S. PATENT DOCUMENTS 4,702,689 A * 10/1987 Schmidt et al. ............... 425/548
4,793,795 A * 12/1988 Schmidt et al. ............... 425/549

(Continued)

FOREIGN PATENT DOCUMENTS

DE           2938832           4/1981
DE        10297058 T5        10/2004

(Continued)

OTHER PUBLICATIONS

International Search Report issued in Int'l Patent Application No. PCT/EP2012/074285, dated May 7, 2013.

(Continued)

*Primary Examiner* — Tim Heitbrink
(74) *Attorney, Agent, or Firm* — Barnes & Thornburg LLP

(57) ABSTRACT

A hot channel distributor arrangement for a hot channel system that can particularly be heated during a heating phase, which is designed to supply plastic melt from a pour-in opening for at least two nozzle arrangements that can be moved relative to and independently of one another, each having at least one outlet opening in the region of a nozzle body, wherein at least one main distributor block having at least one main distributor arm is provided, said main distributor block being rotatable around a first rotational axis, wherein at least one auxiliary distributor block is arranged on the at least one main distributor block, said auxiliary distributor block forming at least one auxiliary distributor arm and being rotatable around a second rotational axis, wherein an angle between the main distributor block and the auxiliary distributor block is adjustable, wherein at least one of the nozzle arrangements is provided on each auxiliary distributor arm, and wherein the angle between the main distributor arm and auxiliary distributor arm changes due to thermal expansion at least during the heating phase.

27 Claims, 17 Drawing Sheets

(56) References Cited

U.S. PATENT DOCUMENTS

| | | | |
|---|---|---|---|
| 4,810,184 A * | 3/1989 | Gellert et al. | 425/548 |
| 5,000,675 A | 3/1991 | Gellert et al. | |
| 5,540,580 A | 7/1996 | Takada | |
| 6,461,140 B1 | 10/2002 | Bosg et al. | |
| 7,172,411 B2 * | 2/2007 | Fairy | 425/570 |
| 2009/0191300 A1 | 7/2009 | Baumann et al. | |

FOREIGN PATENT DOCUMENTS

| | | |
|---|---|---|
| DE | 602004002897 T2 | 2/2007 |
| DE | 102009021794 | 11/2010 |
| EP | 2279846 | 2/2011 |
| JP | S61188118 | 8/1986 |
| JP | 2008062521 | 3/2008 |
| WO | WO 2011/004418 | 1/2011 |

OTHER PUBLICATIONS

German Search Report issued in German Patent Application No. 10 2011 056 060.2, dated Jul. 25, 2012.

* cited by examiner

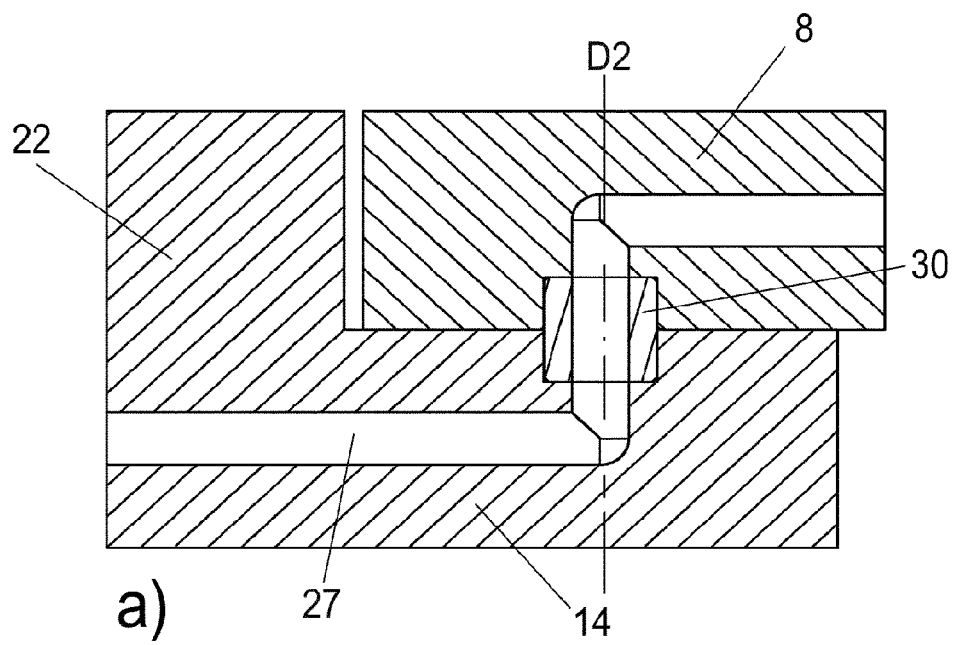
Fig. 10

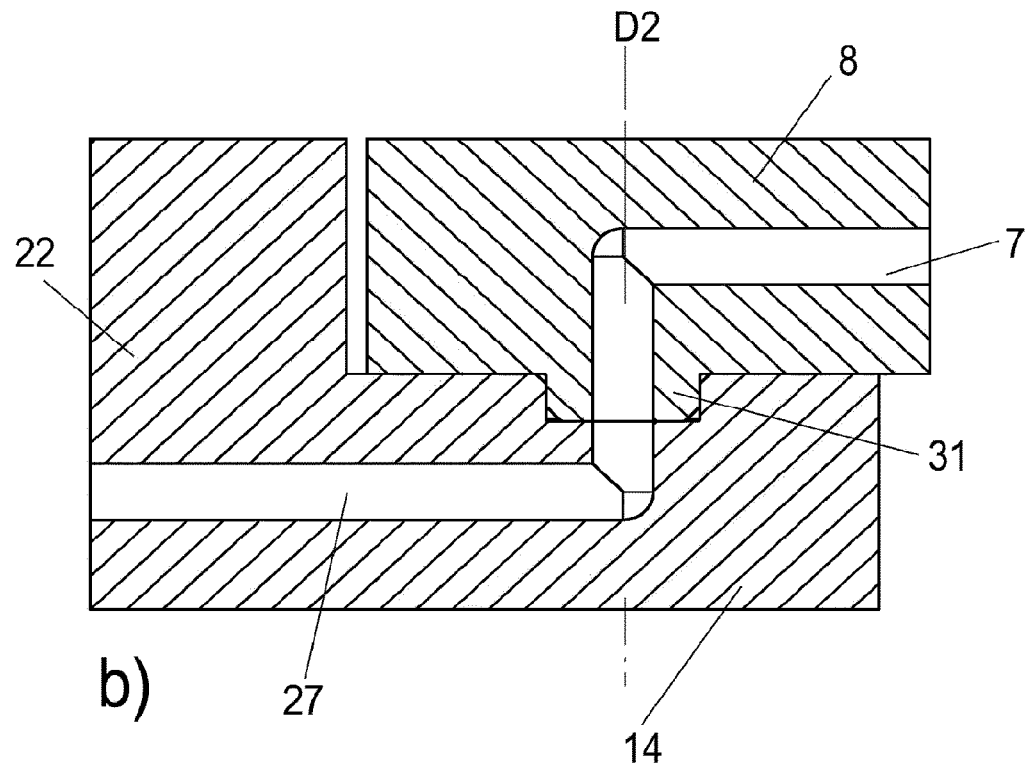
Fig. 11

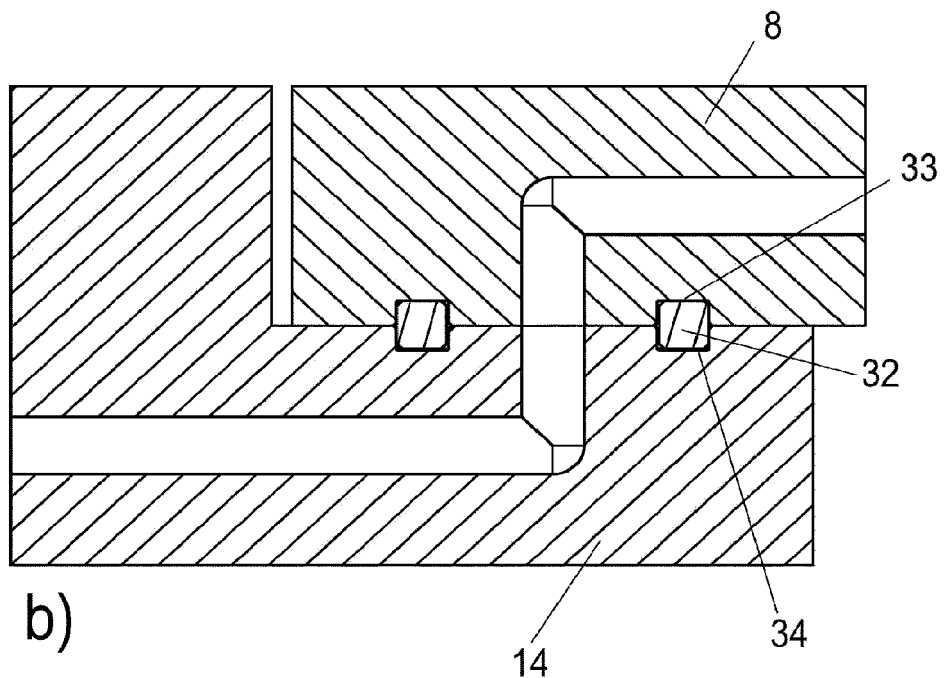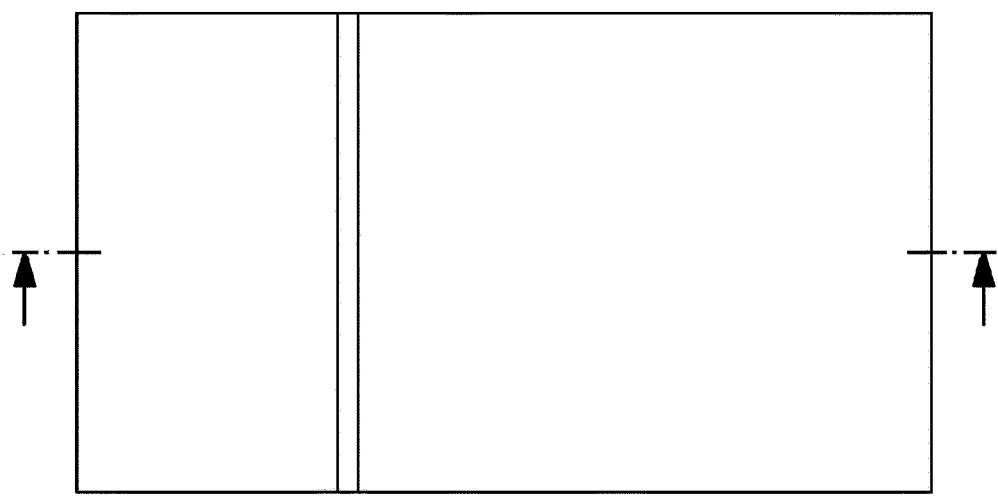
Fig. 12

HOT CHANNEL DISTRIBUTOR ARRANGEMENT FOR A HOT CHANNEL SYSTEM

BACKGROUND OF THE DISCLOSURE

The disclosure relates to a hot channel distributor arrangement for a hot channel system.

Reference is made at first to DE 29 38 832 concerning the general technological background of the technology of hot channel systems.

In order to injection-mold several mold cavities, several nozzle arrangements are required, which are optionally provided with sealing needles, whose positions are to be adjusted to those of the respective mold cavities.

A hot channel injection system is described in U.S. Pat. No. 5,540,580, which is configured for so-called "blow molding", i.e. for a blow injection method, in order to produce hollow containers such as plastic bottles. It is disclosed in U.S. Pat. No. 5,540,580 that several distributor blocks can movably be arranged with respect to each other, wherein the pressing pressure between the inlet or pour-in opening of the main distributor channel system and the only outlet can be used in order to seal the arrangement.

Reference is further made to U.S. Pat. No. 5,000,675. It discloses that several nozzle arrangements, which are respectively pivotable about two rotational axes, are arranged on a distributor block. The nozzle arrangements respectively comprise an outlet opening for the melt, from which the melt exits or is guided into mold cavities of an injection mold. The pivotable nozzle arrangements must be fixed in their respective position by two clamping jaws which are penetrated by screws. The limited local mobility of the nozzle arrangements and bodies is an impediment to many applications. Also, the fixing of the nozzle arrangement in its end position for performing the actual injection process is inadequate for the prevailing high pressures. In particular, it is impossible to provide a longitudinal adjustment of the nozzle arrangements relative to each other and thus no compensation for thermal expansion is provided for. Thus, the components of the system are loaded by the high pressures which are necessary for injection molding, and must also additionally accommodate the tensions which are produced by thermal expansion. These high loads have a negative influence on the operational lifespan of the hot channel system.

It is intended to provide an improved multi-nozzle hot channel distributor arrangement as compared to the aforementioned state of the art, which permits a substantially independent adjustment of several hot channel nozzles over a relatively large surface area in a simpler way and which substantially prevents the build-up of thermal tensions in the hot channel system.

SUMMARY OF THE DISCLOSURE

An illustrative hot channel distributor arrangement may include one or more main distributor block configured to pivot about a first rotational axis. Each main distributor block may include at least one main distributor arm. An auxiliary distributor block may be arranged on each main distributor arm of each main distributor block and rotatable with respect to the main distributor arm about a respective second rotational axis. A nozzle arrangement may be provided on each auxiliary distributor block. The relative position at least between the main and auxiliary distributor block/blocks or the respective arms may be fixed in a clamping fashion only in the heated operating state of the hot channel system by thermal expansion directly in the region of the second rotational axes. In the cold state and during a heating phase of the hot channel distributor arrangement, a change in the angular position between the main distributor arm and the auxiliary distributor arm which is arranged thereon may be possible, especially when this angle is not equal to 0° or 180°. For example, the respective main distributor arm and the auxiliary distributor arm which is linked thereto in an articulated manner may be set so that they are not situated on a straight line, i.e. the angle between them is not 0° or 180°. The location of the second rotational axes can change during heating (preferably with a heating device, especially to 180° C. to 350° C.), so that compensation for thermal expansion occurs in a simple manner. The first rotational axis D1 of the at least one main distributor block and the locations of the melt outlet, i.e. the hot channel nozzles on the auxiliary distributor blocks, but not the second rotational axes of the auxiliary distributor arms on the main distributor block may be fixed after an adjusting process and after a subsequent assembly of the system plus the surrounding tool or die before the heating of the system to the operating temperature required for injection.

As a result of the preferably mere fixing by clamping in the adjacent tool, it is possible to omit the separate clamping jaws which are provided in the region of the pivoting axes according to U.S. Pat. No. 5,000,675. Instead, the setting of the nozzle arrangements is carried out according to the respective position of the mold cavities in the cold state of the system, i.e. the non-clamping state. The fixing of this position is achieved without the necessity to actuate any fixing means such as screws in the heated state or in the state heated to operating temperature only by a press fit due to thermal expansion, wherein the clamping points are preferably arranged directly above and beneath or on either side of the pivot bearing or pivot area between the main and auxiliary distributor arms, so that a direct clamping effect is achieved at the location of relative mobility, which is sufficiently tight even under high pressure loads.

If more than two nozzle arrangements are used, two or more main distributor blocks may be provided, such that the two or more main distributor blocks are pivotable independently from each other and relative to each other about the first rotational axis or a first common rotational axis transversely to the main extension of the main distributor blocks.

In an illustrative embodiment, each main distributor block comprises two main distributor arms extending transversely to the first rotational axis in opposite directions. The ends of the main distributor arms are preferably movable on a circle or can be moved on a circle about a common center, i.e. the first rotational axis.

In an illustrative embodiment, one each of the auxiliary distributor arms is pivotably arranged on each of the main distributor arms, so that fine adjustment is possible within a ring segment starting from the rough position set on a circle that can be respectively travelled by the main distributor arm. As a result, the ends of the auxiliary distributor arms are pivotable about the second rotational axes of the main distributor arms and said second rotational axes are again rotatable or pivotable on a circle about the first rotational axis or about a central distributor section.

Sealing means may be arranged in the transitional or contact region of the distributor channels between the main and auxiliary distributor arms. These sealing means may include one or several of the following features:

a melt guide sleeve placed between at least one of the main and auxiliary distributor arms in their contact region;

a sleeve-like projection arranged on one of the auxiliary distributor arm and main distributor arm which engages in a respective recess of the other of the main or auxiliary distributor arm, and a sealing ring arranged between at least one of the main and auxiliary distributor arms in their contact region.

As a result, both a high tightness and also a certain advantageous relative mobility at least during the heating of the system can be realized by simple means.

In an illustrative embodiment, pressing elements, and rings in particular, are placed on the main and auxiliary distributor arms (e.g. screwed thereon) on one side or on both sides of the joint regions between the main and auxiliary distributor arms, which pressing elements preferably form flat contact areas and are configured for sitting close to correspondingly arranged die elements, which are also flat for example.

As a result, an especially smooth and defined introduction of force can occur for realizing a press fit of the joint regions between the main and auxiliary distributor arms of the arrangement between the elements of the surrounding hot channel system in the heated or hot operating state of the arrangement.

As such, the disclosure relates to at least one hot channel nozzle (or several thereof), which is or are pivotable on at least one main distributor arm or several distributor arms and at least one auxiliary distributor arm or several distributor arms connected thereto, and in which an advantageous sealing of the hot channel system occurs with the system components which are adjustable relative to each other before an injection process and which are movable relative to each other within limits during heating for the compensation of heat-induced expansion.

In an illustrative embodiment, the at least two nozzle arrangements with the hot channel nozzles can be positioned independently from each other on a surface area which is produced by the pivotability of the distributor arms and which can be travelled over as a result of the pivoting capability and which is thus "defined". This allows a substantially independent positioning capability of at least two or more nozzle arrangements or their hot channel nozzles in a plane with the simple means of pivotability.

As a result of the pivotability, the surface area of the possible positions of the nozzle arrangements which can be described or defined by the distributor arms is in the shape of a circular ring or a partial circular ring, so that an adjustability is obtained which covers an especially large area in combination with low constructional effort, wherein there is a further special advantage that the length of the melt channel of an associated hot channel nozzle is equal in each position of the surface area irrespective of the distance between the hot channel nozzle and the pour-in opening. It is preferably even provided that all main and auxiliary distributor arms are of equal length. This is not mandatory however.

The angle in the operating state between the main distributor arm and the auxiliary distributor arms may always be greater or less than 180°.

As a result of the sealing construction, it is possible that the angle between the main distributor arm and the auxiliary distributor arm changes by thermal expansion, especially during the heat-up phase.

Transverse forces, which are produced by the change in length in the thermal expansion of the hot channel system and act on the hot channel nozzle, are compensated partly or completely by the change in the angle between the main distributor arm and the auxiliary distributor arm.

The hot channel distributor arrangement can be used for tools with different hot channel nozzle distances.

BRIEF DESCRIPTION OF THE DRAWINGS

FIGS. 10 a, b-FIGS. 12 a, b show a top view and a sectional view of a partial area of various variants of hot channel distributor arrangements;

DETAILED DESCRIPTION OF THE DRAWINGS

Figure 1:
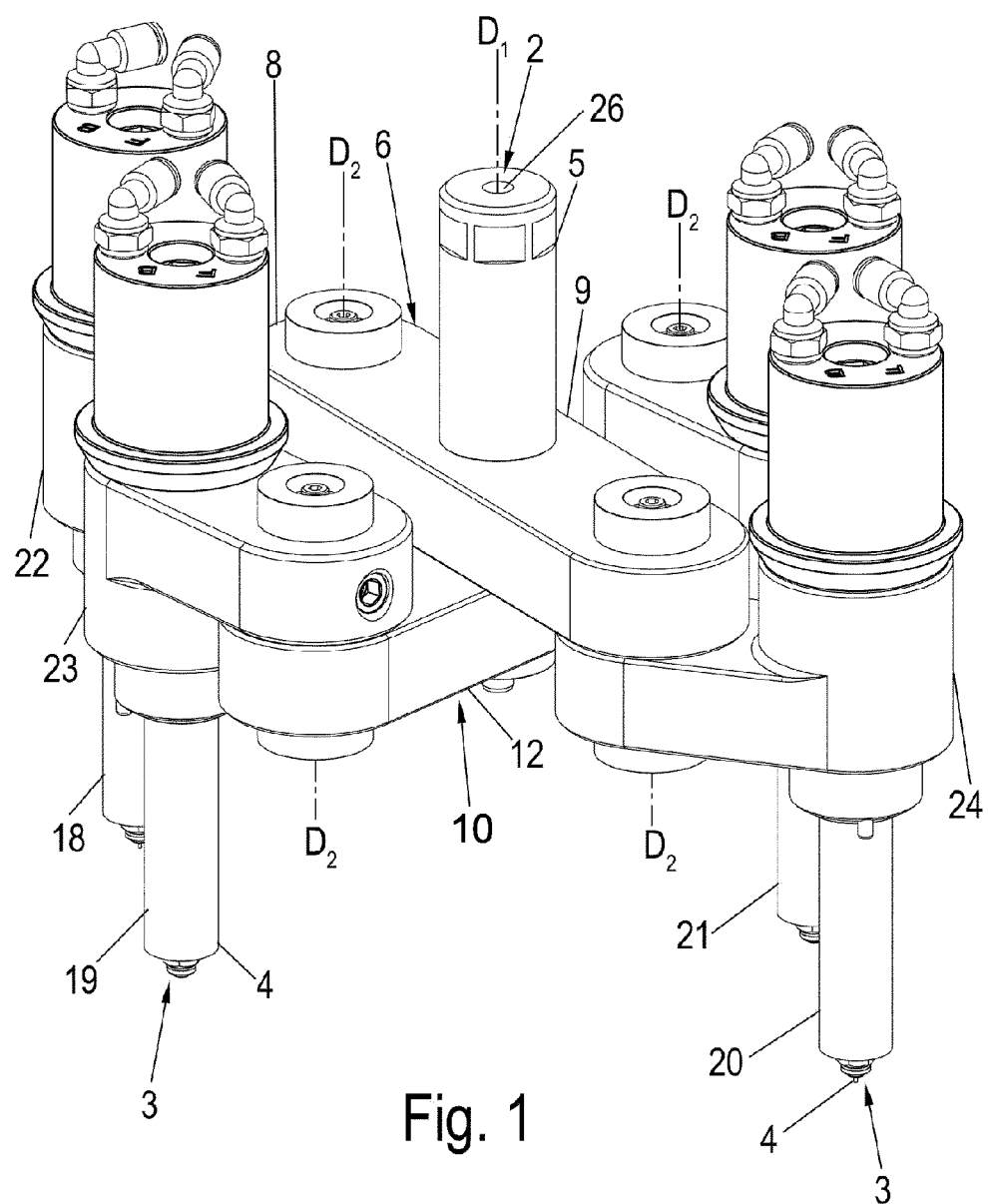
FIG. 1 shows a perspective view of a first illustrative hot channel distributor arrangement.
Figure 2:
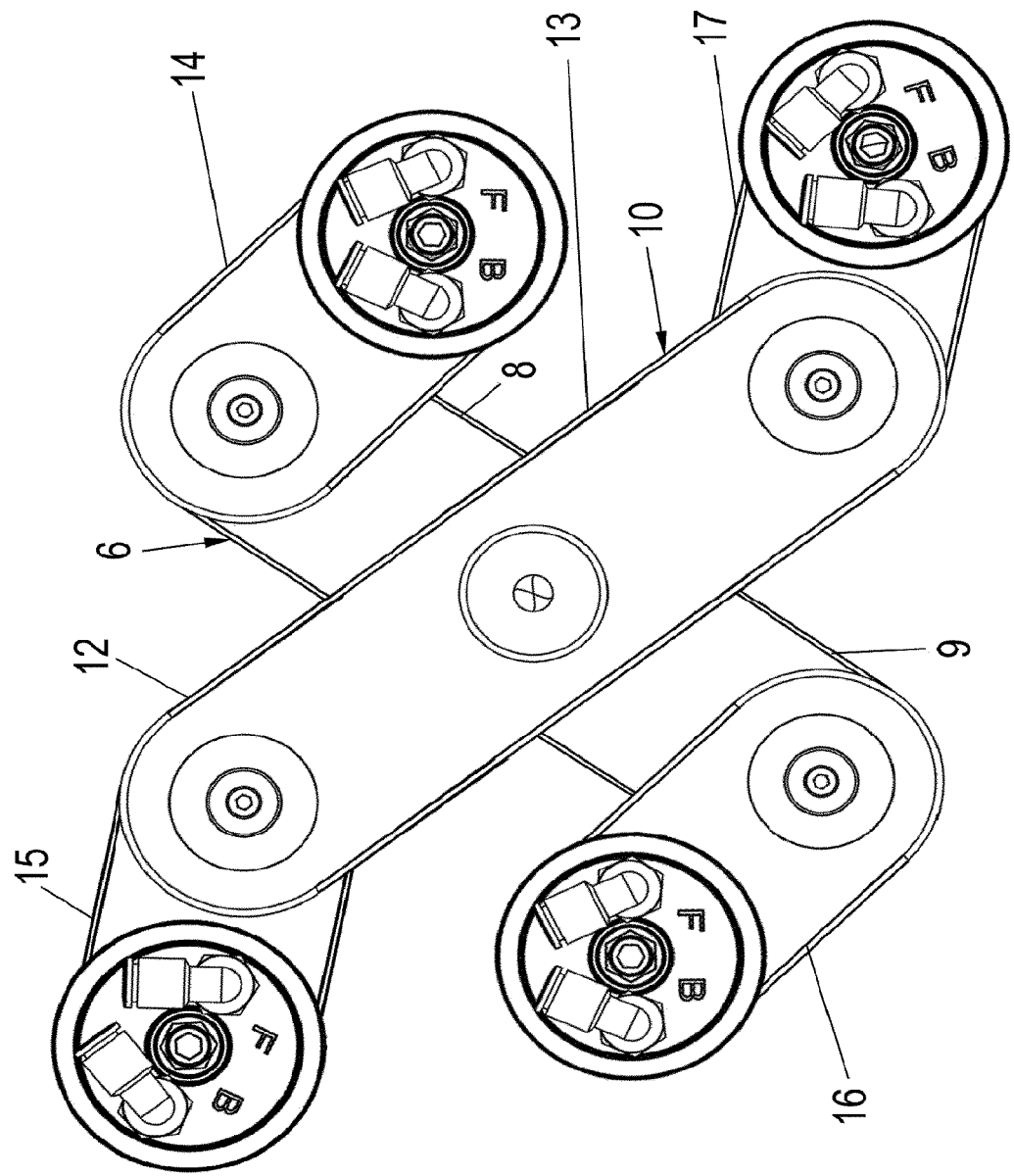
FIG. 2 shows a top view of the arrangement of FIG. 1.
Figure 3:
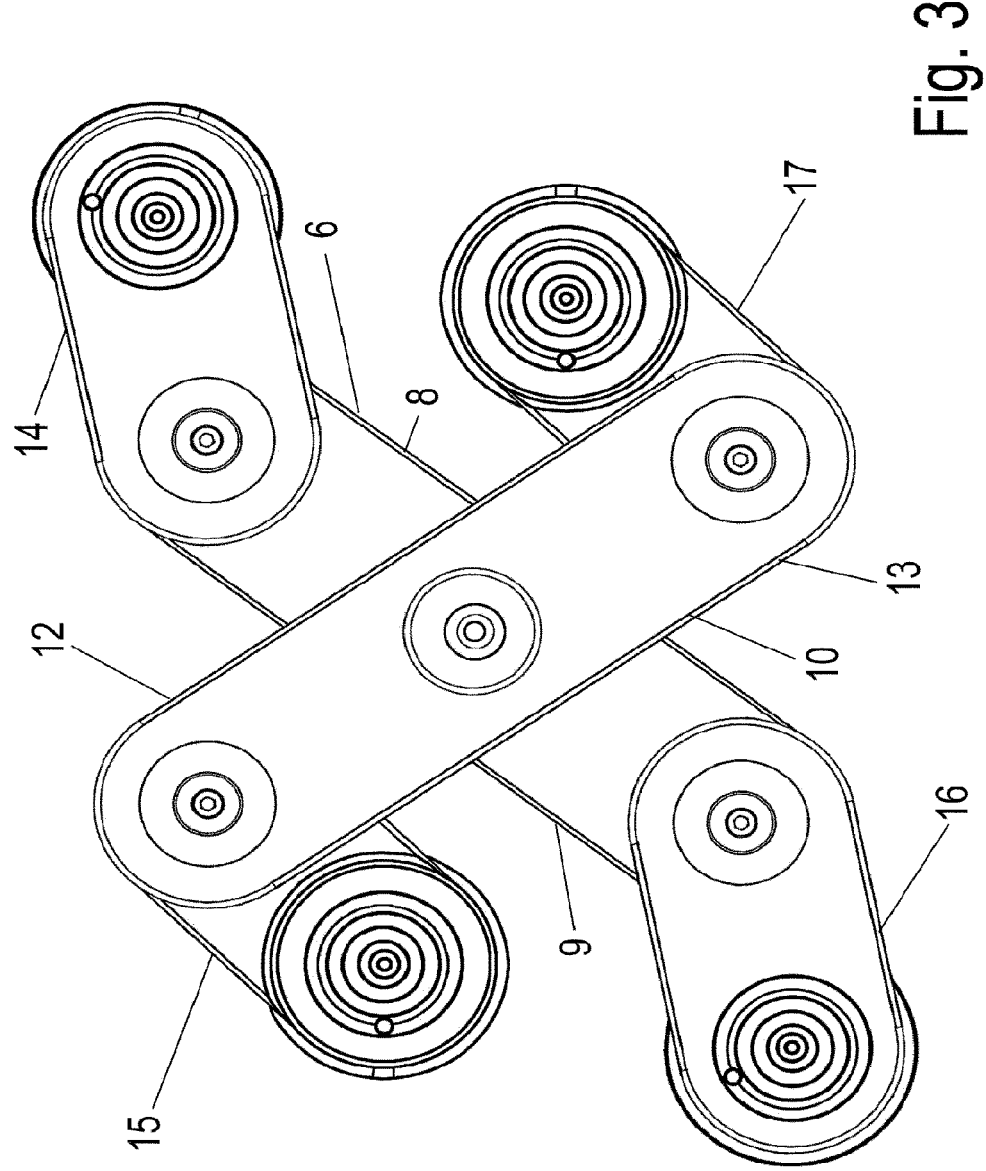
FIG. 3 shows a view of the bottom side of the arrangement of FIG. 1.

In so far as terms such as "top", "bottom", "horizontal" etc. are used, they relate to the respective illustration in the drawings and shall not be understood in any limiting way and shall respectively be applied accordingly to other positions of the arrangements. Specialist terms shall be understood in their usual specialist way, unless defined otherwise in connection with this application.

Figure 13:
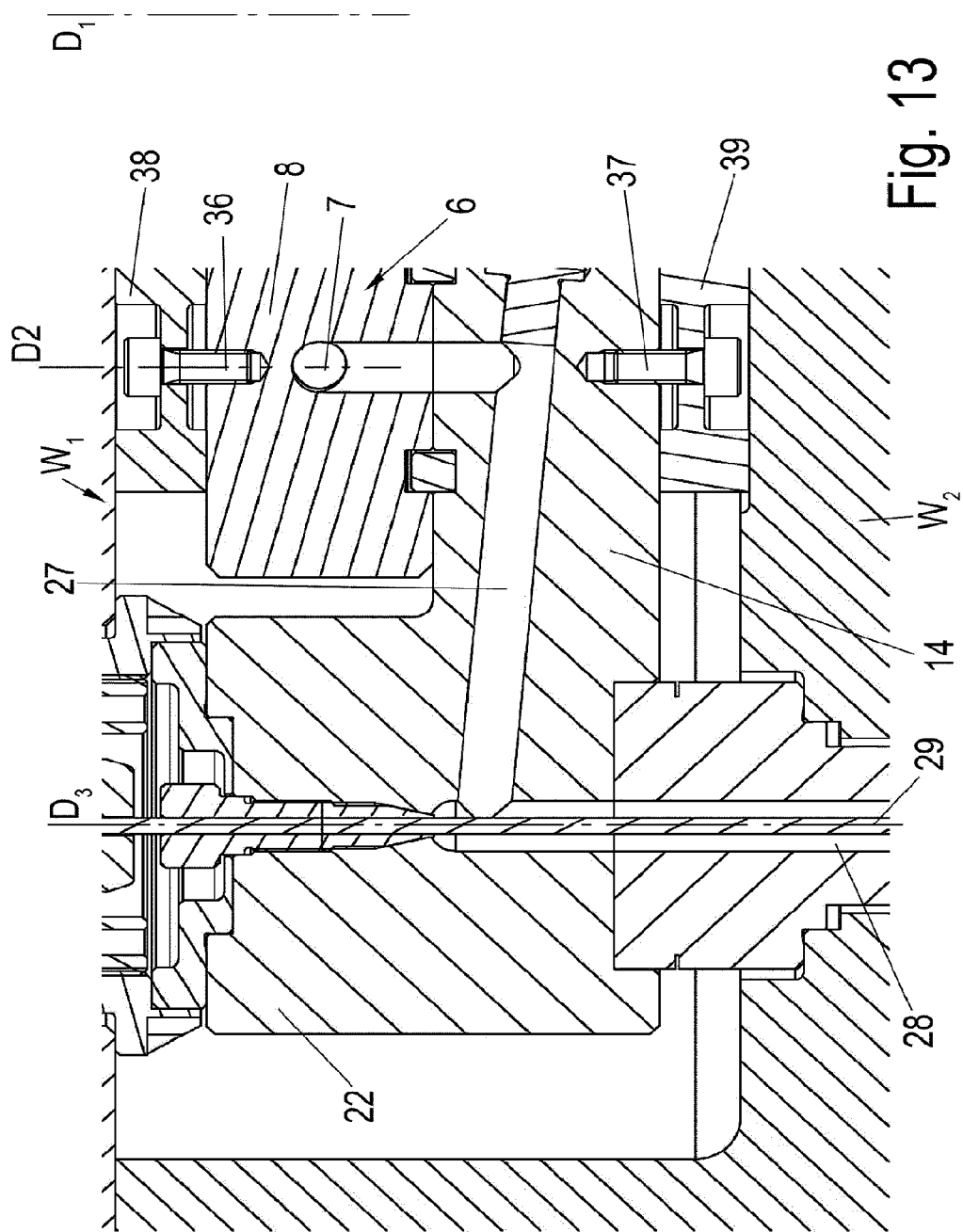
FIG. 13 shows a sectional view through a part of a hot channel distributor arrangement inserted into a hot channel system or a die of an injection-molding machine.

FIG. 1 discloses a hot channel distributor arrangement 1, which can be used on or in a hot channel system. Reference is further made to FIG. 13, which shows the hot channel distributor arrangement 1 in a hot channel system or in a state inserted in a surrounding hot channel distributor channel system.

The hot channel distributor arrangement 1 may be used for feeding a plastic melt, which enters a pour-in opening 2 of the hot channel distributor opening, to at least one or several outlet openings 3 to which the plastic melt is respectively conducted into a mold cavity of an injection mold (not shown). A respective nozzle arrangement 18 to 21 with a tip and/or a sealing needle can be arranged on the outlet opening/openings.

Figure 9:
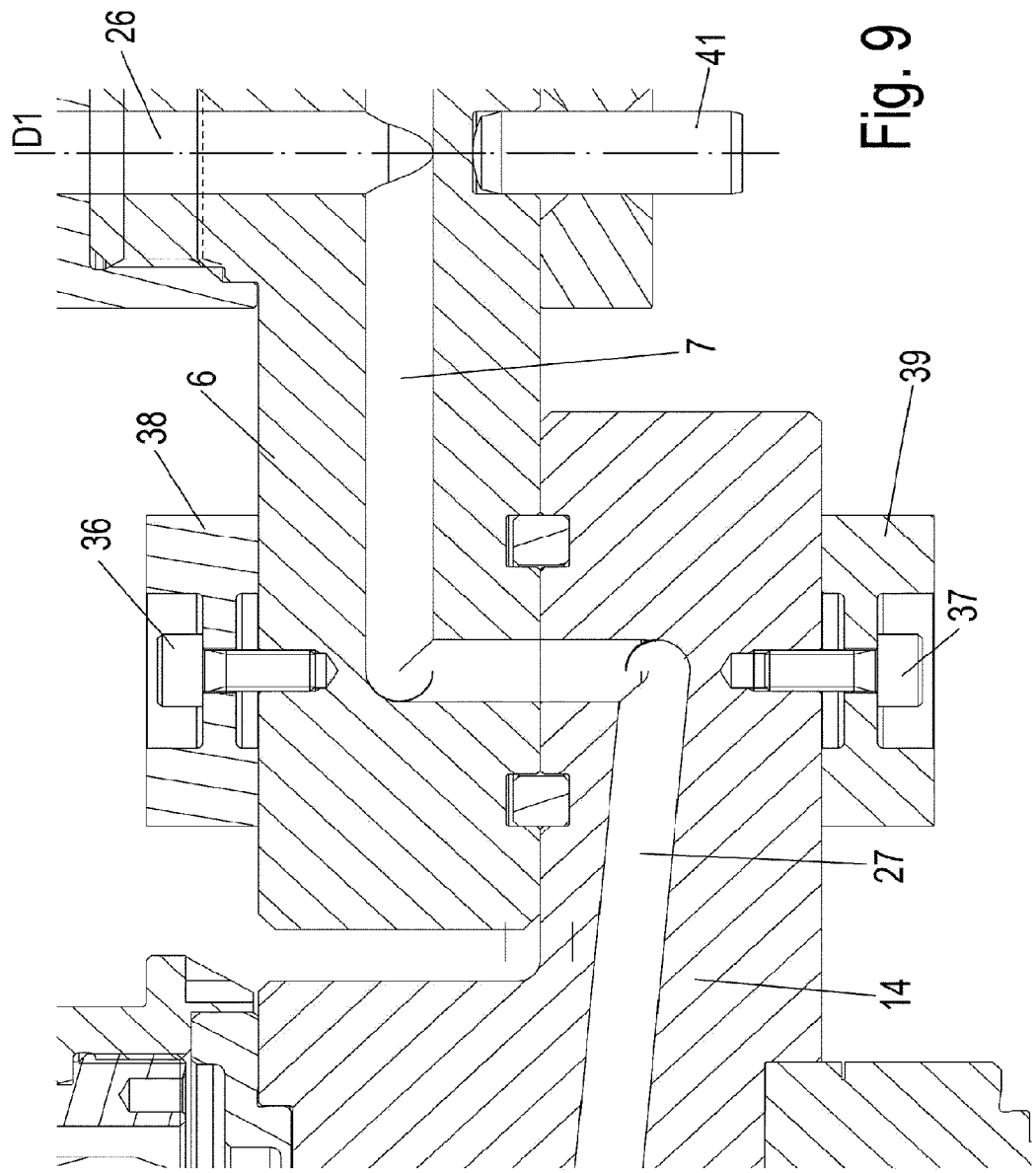
FIG. 9 shows a sectional view through a part of the arrangement of FIG. 4.

The hot channel distributor arrangement 1 comprises a first distributor section 5, which is arranged in this case as a cylindrical body which comprises the pour-in opening 2 at its upper end (as shown in FIG. 1) and which is concentrically penetrated by a distributor channel 26 (see FIG. 9). The distributor section 5 may be aligned vertically.

A first main distributor block 6 is placed on the distributor section 5, which distributor block comprises a distributor channel 7, wherein the first main distributor block 6 and the distributor channel 7 extend "horizontally" or at a right angle/ perpendicularly to the distributor section 5, and wherein the first main distributor block 6 comprises two main distributor arms 8, 9, against which the distributor section 5 is placed in a region between the ends of the main distributor arms 8, 9 (in this case approximately centrally between the ends of the main distributor arms).

The extensions of the distributor channel 7 need not necessarily extend horizontally or at a right angle/perpendicularly as in the illustrated embodiments. The first extensions of the distributor channel 7 may instead be configured to be optimized with respect to distance, pressure or temperature in the distributor blocks in order to realize the most even flow of the melt.

A second main distributor block 10 is further arranged beneath the first main distributor block 6, which second main distributor block comprises a distributor channel (not shown) analogous to the first main distributor block, wherein the second main distributor block 10 and its distributor channel extend substantially at a right angle to the distributor section 5, and wherein the main distributor block 10 again comprises two main distributor arms 12, 13. The distributor channels of the first main distributor block 6 and the second main distributor block 10 communicate with each other or are connected to each other.

The main distributor block 6 and 10 are aligned approximately crosswise in the exemplary operating positions as chosen here.

The at least one or all main distributor blocks 6 and 10 are preferably rotatable about the longitudinal axis D1 (the first rotational axis) of the distributor section 5 in order to enable carrying out a basic setting before the actual hot channel injection.

It is further advantageous if the main distributor blocks 6, 10 are also twistable relative to each other about said rotational axis D1 (FIG. 1).

It is also possible that the distributor section 5 itself is rotatably arranged about its longitudinal axis on a superordinate machine frame (not shown).

As a result, any points or locations situated on a circle can be accessed by the ends of each of the main distributor arms 8, 9, or 12, 13 (if any).

The outlet openings 3 for the melt conducted through into the mold cavities are not formed directly at the ends of the main distributor arms 8, 9 and 12, 13. Instead, auxiliary distributor blocks which form auxiliary distributor arms 14 to 17 are arranged on the ends of the main distributor arms in order to also allow setting different radii for the outlet openings 3 starting from the set positions, which auxiliary distributor blocks are pivotable on circles about a pivoting axis D2 in the end region of the main distributor arms 8, 9; 12, 13.

As a result, the ends of the main distributor arms are pivotable like planets about a center (the longitudinal axis of the distributor section 5), and the auxiliary distributor arms 14 to 17 are pivotable like satellites about planets about the ends of the main distributor arms 8, 9; 12, 13.

The actual nozzle arrangements 18 to 21 with the outlet openings 3 into the respective mold cavities are formed on the ends of the auxiliary distributor arms 14 to 17.

The set pivoting positions of the auxiliary distributor arms 14 to 17 on the main distributor arms 8, 9; 12, 13 can be fixed by means of suitable fixing means such as pins and/or a clamping mechanism of a superordinate tool with plates W1, W2 or other elements (not shown).

A large variety of positions not only on a circle but also within a circular ring area KF around the central rotational axis D1 can be set by suitable setting and adjustment of the position of the main and auxiliary distributor arms 8, 9; 12, 13 or 14 to 17 (the rotational axes D1 of the main distributor arms and the rotational axes D2 of the auxiliary distributor arms to the main distributor arms are respectively aligned in parallel with respect to each other), wherein the size and the position of this circular ring area is determined or can be determined by the respective length of the arms and elements optionally arranged thereon.

This is shown for example by a comparison of FIGS. 4 to 8, according to which only one main distributor block 6 is provided. It is shown how various positions can be set (FIGS. 5 and 6) and how a selection of differently long main distributor arms 6 allows setting different areas or circular ring areas KF at first (compare FIGS. 5 and 6 as well as 7 and 8).

The hot channel distributor arrangement may allow adjustment of the position of the outlet openings 3 within a predetermined ring area region around the center so that the positions of the outlet openings 3 can be adjusted according to the various mold cavity positions.

The set position of the main distributor and the auxiliary distributor arms is fixable, especially by means of a superordinate clamping mechanism (see FIG. 13). The clamping mechanism acts especially in the region of the first and the second rotational axes D1, D2.

The clamping mechanism can be formed by elements such as plates W1, W2 (see FIG. 13) of a superordinate die or hot channel system.

The adjustment preferably occurs in such a way that as a result of the thermal expansion of the elements of the hot channel distributor arrangement they are sufficiently tightly chucked or clamped upon reaching the operating temperature between adjacent die elements ("top" and "bottom" in FIG. 1), so that a high tightness is achieved in the transitional regions between the main and auxiliary distributor arms 8, 9; 12, 13 and 14 to 17, and preferably also between the two main distributor arms 8, 9; 12, 13 and the distributor section 5. These elements touch respective elements (similar to the elements W1 and W2) of the surrounding system in the heated state of the system.

If the hot channel distributor system is not at operating temperature or is in the cold state, the distributor arms 8, 9; 12, 13 and 14 to 17 are freely movable, so that their position is adjustable according to the respective injection-molding task. Separate fastening means can then even be omitted. A respective arrangement is shown by the aforementioned FIG. 13. A certain amount of relative pivotability between the main distributor arms and the respectively associated auxiliary distributor arms 8, 9; 12, 13 and 14 to 17 that can be pivoted thereon is further also provided during the heating, so that heat-induced changes in the length of the system components can be compensated by a change in the angle.

In the simplest of cases, at least one main distributor block 6 and one auxiliary distributor (for example, auxiliary distributor arm 14) are provided with at least one or preferably two main distributor arms each and one respective auxiliary distributor arm.

Figure 4:
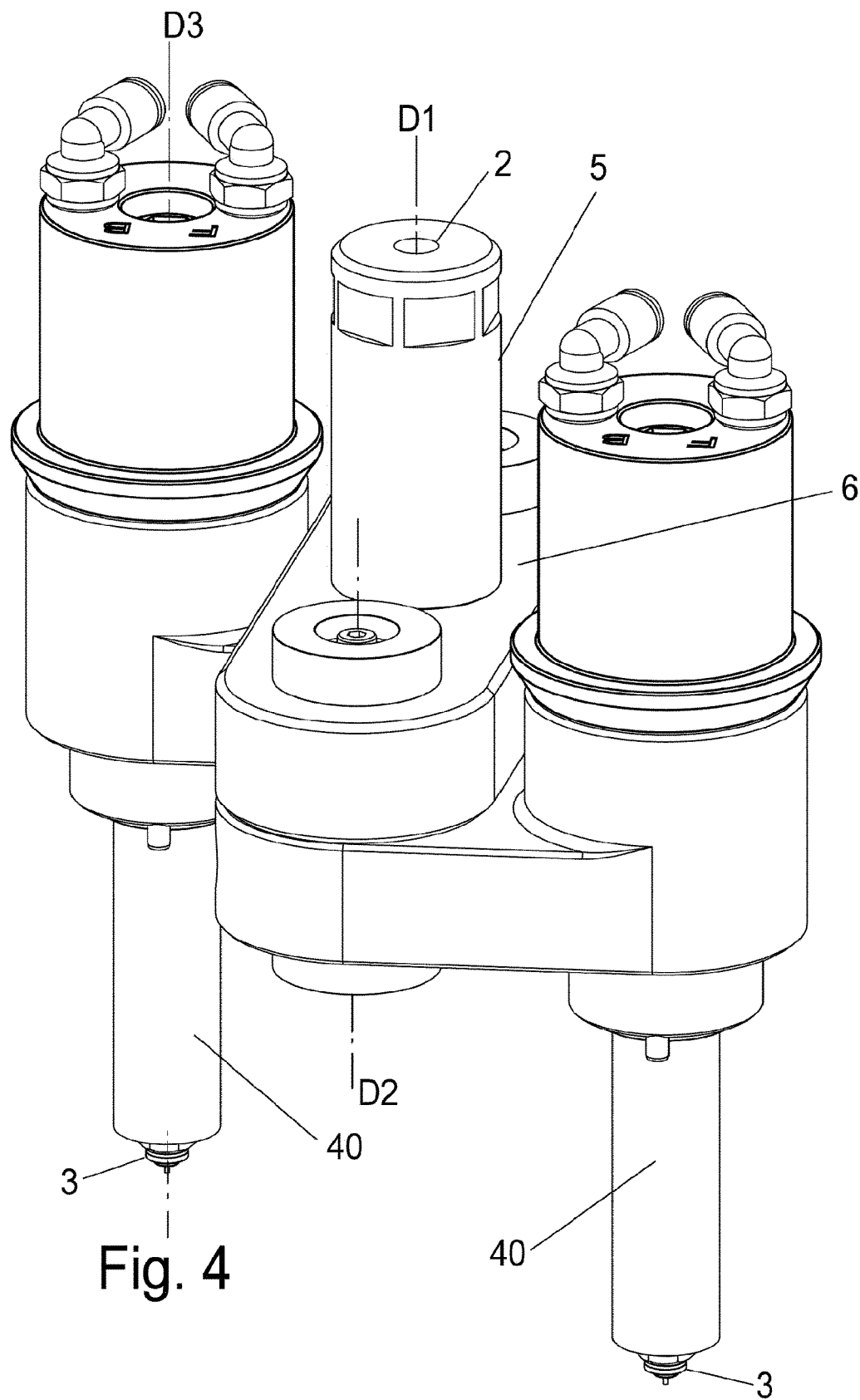
FIG. 4 shows a perspective view of a second illustrative hot channel distributor arrangement in accordance with the invention.
Figure 5:
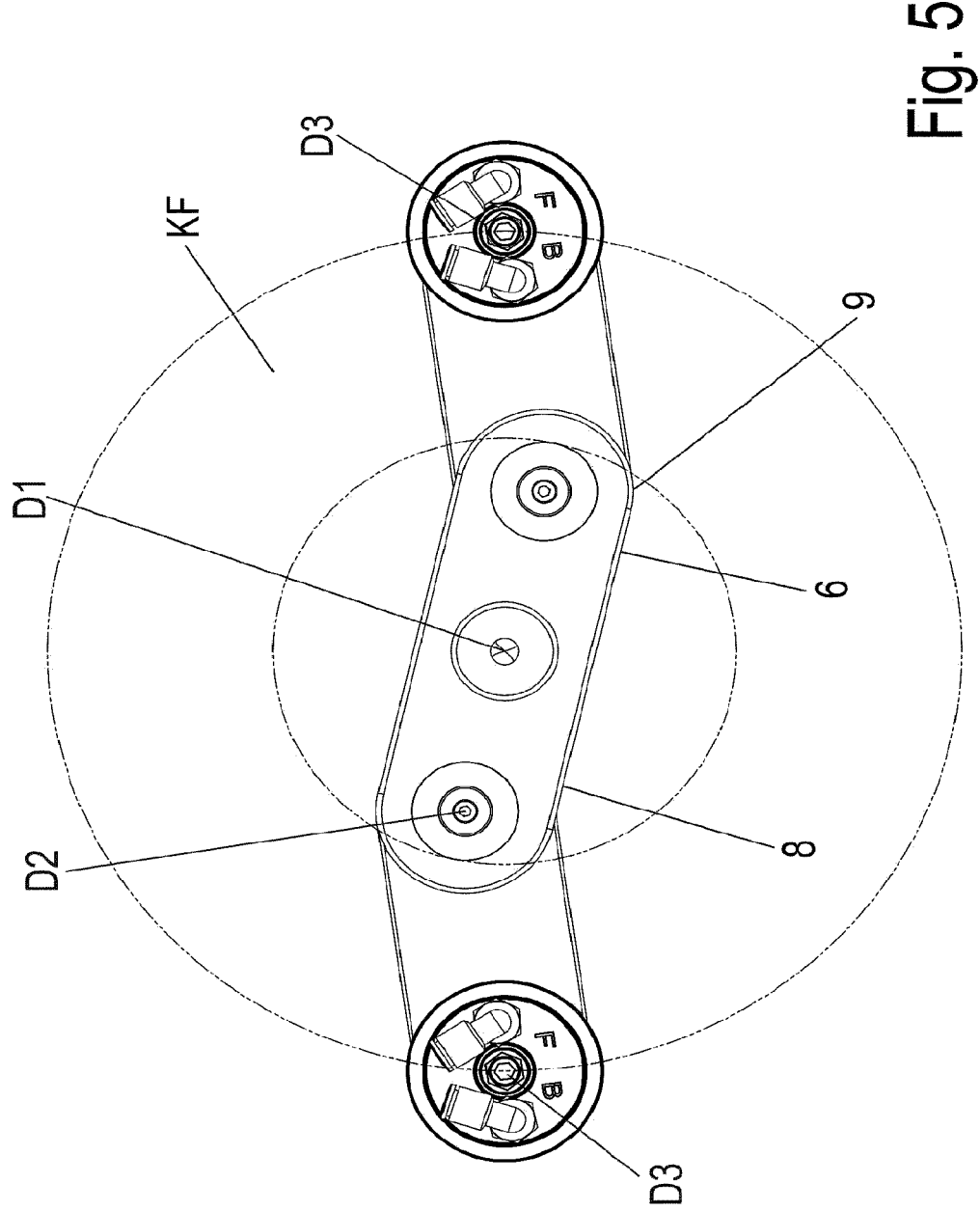
FIG. 5 shows a top view of the arrangement of FIG. 4 in a first operating position.
Figure 6:
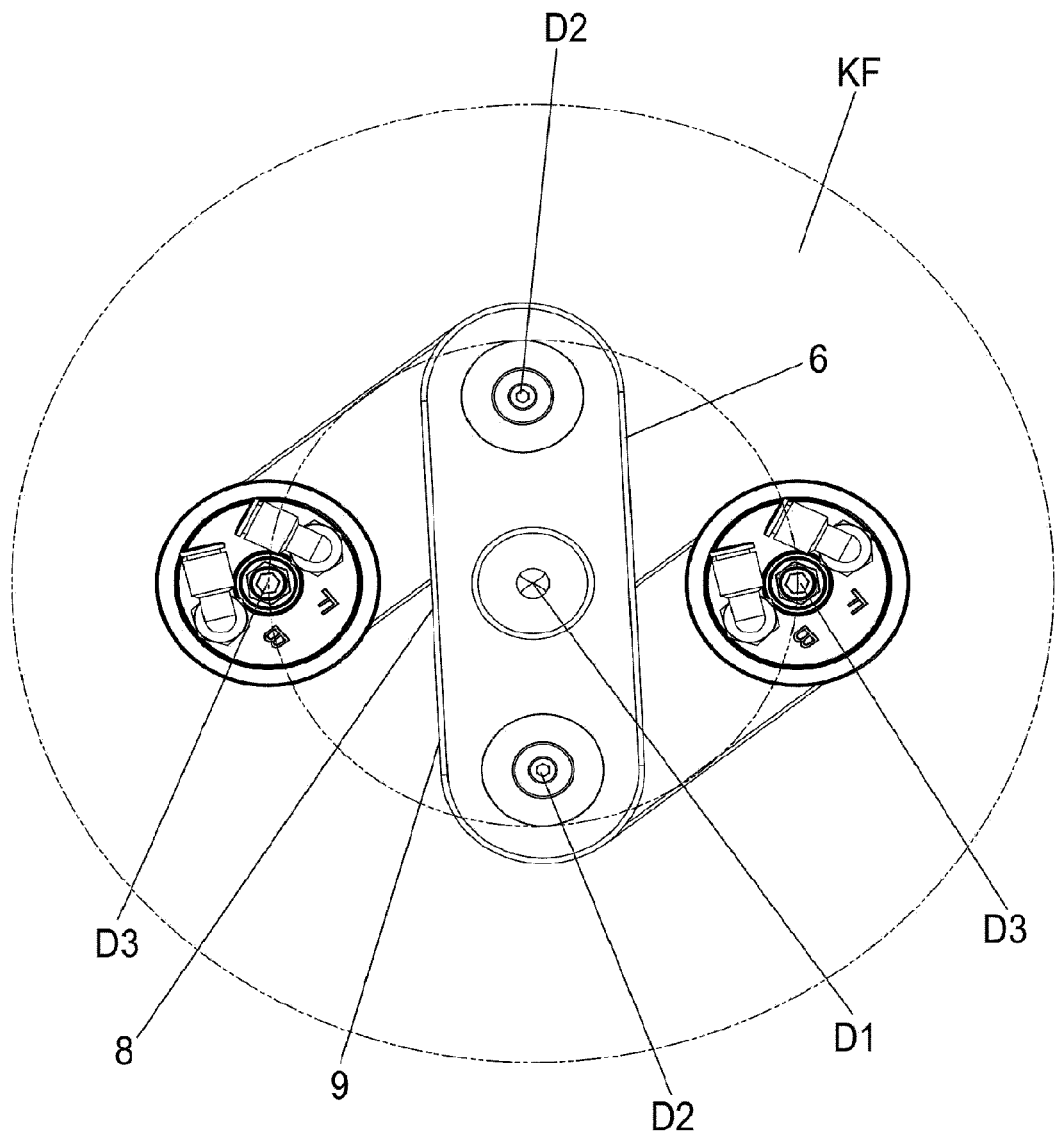
FIG. 6 shows a top view of the arrangement of FIG. 4 in a second operating position.
Figure 7:
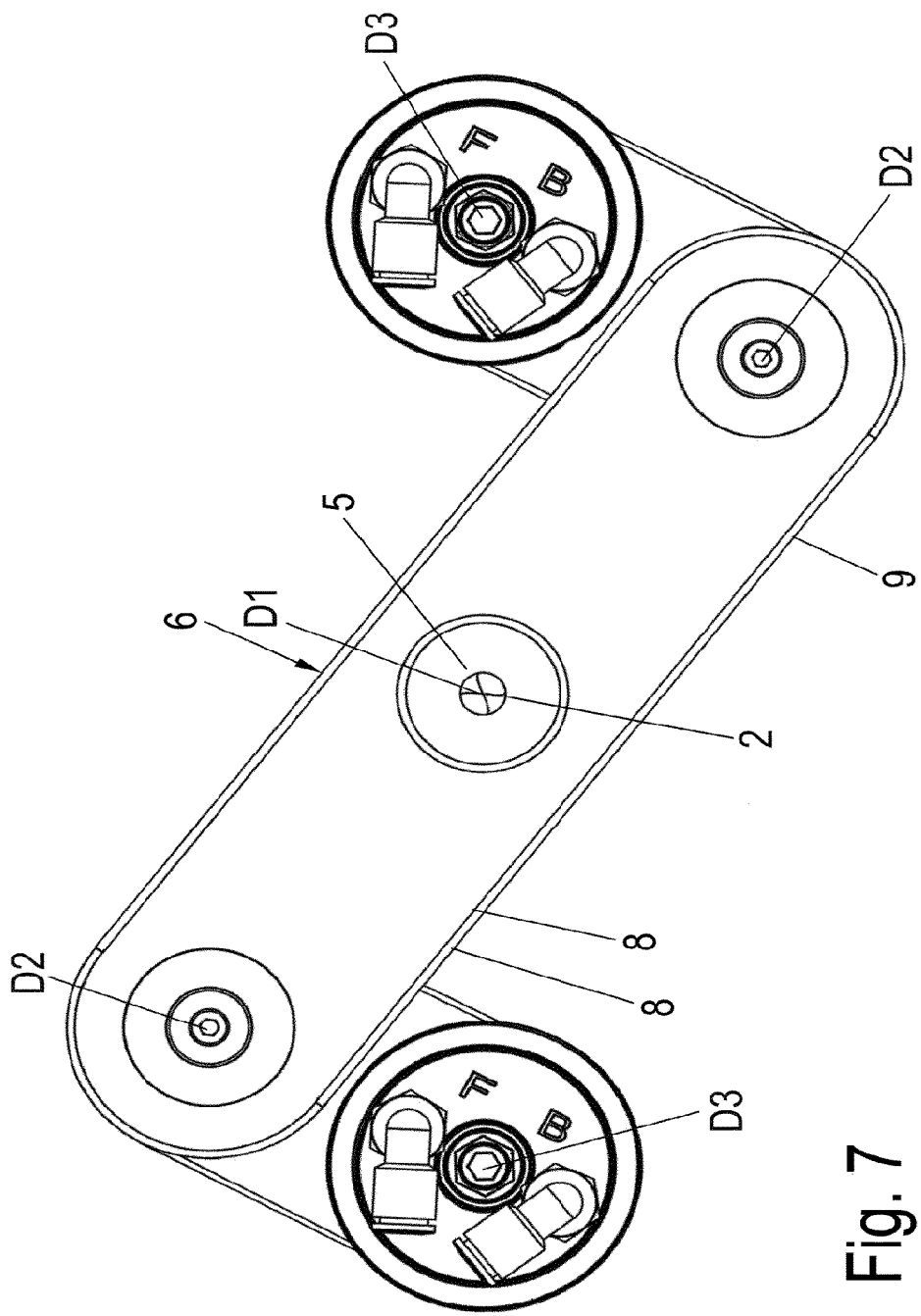
FIG. 7 shows a top view of a third illustrative hot channel distributor arrangement in a first operating position.
Figure 8:
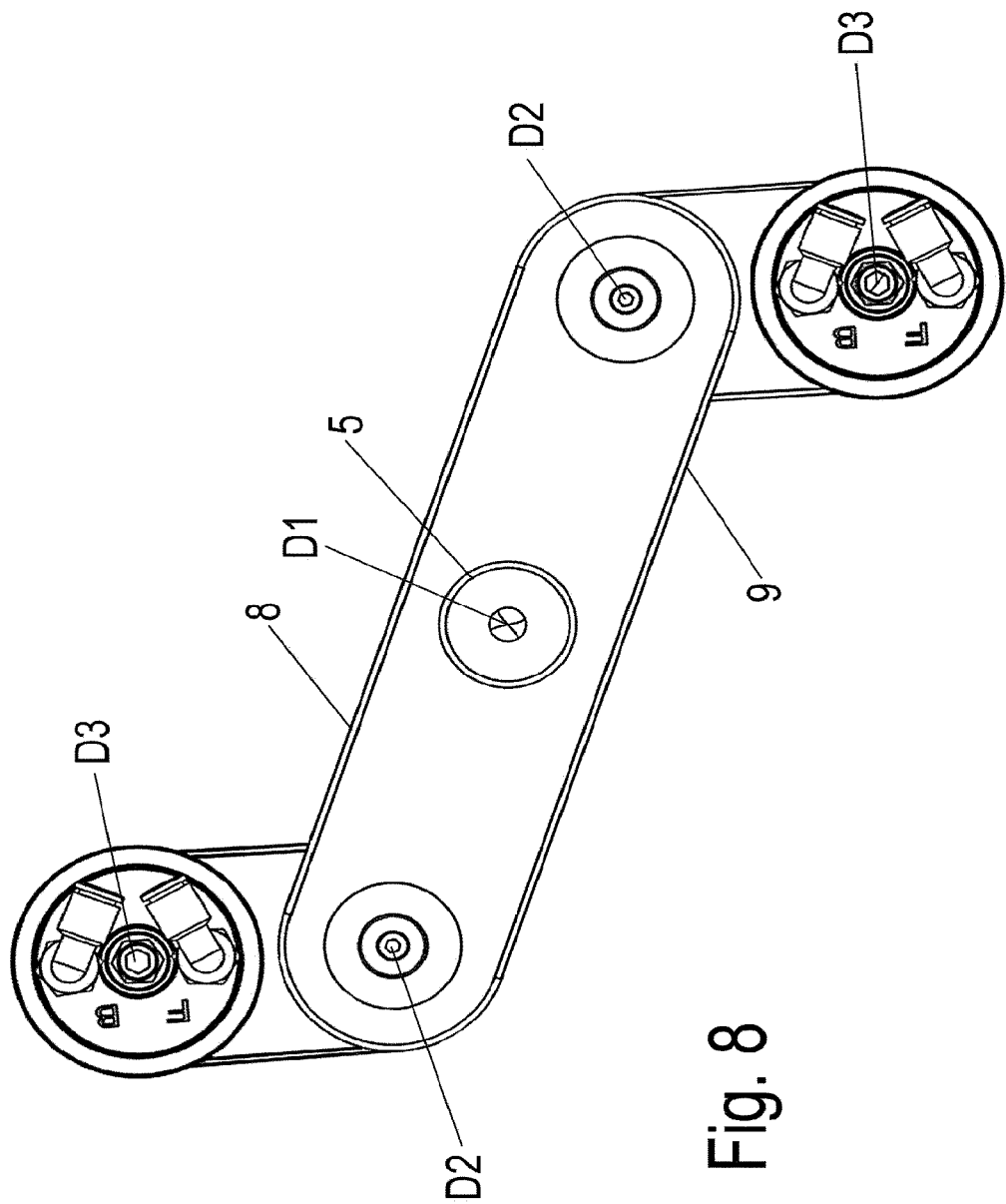
FIG. 8 shows a top view of the arrangement of FIG. 4 in a second operating position.

FIG. 4 shows an illustrative arrangement.

Several main distributor blocks 6 and 10 (as described in connection with FIG. 1) may be provided, which respectively may comprise more than one of the main distributor arms 8, 9 and 12, 13.

A respective one of the auxiliary distributor arms 14, 15, 16, 17 can be arranged in a pivotable manner on each end of each main distributor arm 8, 9, 12, 13.

A compact arrangement may be achieved in such a way that the auxiliary distributor arms 15 and 17 of the main distributor arms 12 and 13 which are at the "bottom" in the Z direction are respectively arranged "above" said main distributor arms, whereas the auxiliary distributor arms 14 and 16 of the main distributor arms 8 and 9 which are at the "top" in FIG. 1 according to the Z direction are respectively arranged "beneath" said main distributor arms, on which or relative to which they are pivotable.

The auxiliary distributor arms 14 to 17 respectively comprise sleeve sections 22 to 25 which are equally long in the Z direction and are arranged in such a way that nozzle arrangements 18, 19, 20, 21 that are inserted therein are respectively situated at the same altitude in the Z direction.

In some applications it may be necessary that the sleeve sections 22 to 25 or the outlet openings 3 are not situated at the same altitude in the Z direction. This mostly concerns injection-molding products with several injection-molding points.

The auxiliary distributor arms 14 to 17 respectively comprise an auxiliary distributor channel, of which one (the auxiliary distributor channel 27) is shown in FIGS. 9 and 13. FIG. 13 also shows that the respective auxiliary distributor channel 27 of horizontal alignment converges into a vertical distributor channel 28, in which the sealing needle 29 is movably guided for example.

The distributor channels extend in a flush manner continuously from the pour-in opening through the main and auxiliary distributor arms 8, 9 and 12, 13 and 14 to 17 up into the nozzle arrangement to the outlet openings 3 with nozzle tips and/or sealing needles 29.

The nozzle body arrangements can respectively comprise heating units and optionally an electric and/or fluid connection in order to actuate a locking mechanism.

It may be advantageous that the respectively set position of the main and auxiliary distributor arms 8, 9 and 12, 13 and 14 to 17 is substantially fixed only in the heated state. Respective sealing measures have been implemented for this purpose at suitable locations.

The expandability, the sealing and the centering in the transitional region from the "main distributor" to the "auxiliary distributor" may be ensured by any of the following principles. For example, bushings can be provided as melt guide sleeves 30 between the transitional regions of the distributor channels between the main and auxiliary distributor arms, which bushings seal the transitional region and ensure rotatability and centering. Alternatively, one or several respective sleeve-shaped projections 31 of the one arm can engage for this purpose in respective recesses of the other arms, or sealing rings 32 can be arranged in annular grooves 33, 34 of the contact areas (FIGS. 10, 11, 12, 17). The relevant aspect is that the tightness after setting occurs solely by thermal expansion and the resulting tight clamping between "top" and "bottom" of respectively adjacent die elements, e.g. die plates W1, W2 (also see FIG. 13).

Sealing preferably occurs on the face side by surface pressing and centering occurs circumferentially.

It can be advantageous again if rings 38, 39 made of steel for example are placed against the distributor arms 8, 9, 12, 13 and 14 to 17 in the contact region to the dies, e.g. on either side or above and beneath the joint regions between the main distributor arms and between the main and auxiliary distributor arms, e.g. by means of screws 36, 37, which rings form flat contact surfaces as pressure elements and which rest in an especially defined way on the die elements W1, W2 (see FIGS. 9 and 13 in particular). As a result of the sealing construction described herein, the angle between the at least one main distributor arm 8, 9 and its at least one auxiliary distributor arm 14 to 17 can even change by thermal expansion especially during the heat-up phase. The transverse forces which are produced by the change in length during thermal expansion of the hot channel system and which act on the nozzle body 40 are compensated for in part or in full by the change in angle between the main distributor arm 8, 9 and its at least one auxiliary distributor arm or several distributor arms 14 to 17.

The main distributor block 6 (and also 10) comprises a rotational axis D1 and is fixed with respect to the "horizontal" thermal expansion in the position of the rotational axis D1. This is advantageously supported by a (joint) pin 41 which is situated centrically in relation to the rotational axis (FIG. 9) and which engages with one of its ends in the main distributor block 6 on the side facing away from the melt inlet and is fixed at its other end accordingly (in any case after an adjustment and an assembly of the system) into a recess of the die (not shown) (see FIG. 13 with respect to the die). The auxiliary distributor arms 14 to 17 on the other hand comprise one adjustable rotational axis D2 each on the main distributor arm. The auxiliary distributor arm 14 to 17, and preferably each thereof, is thus fixed rotatably through the rotational axis D3 in the die via the nozzle body 40 arranged at its free end.

Figure 17:
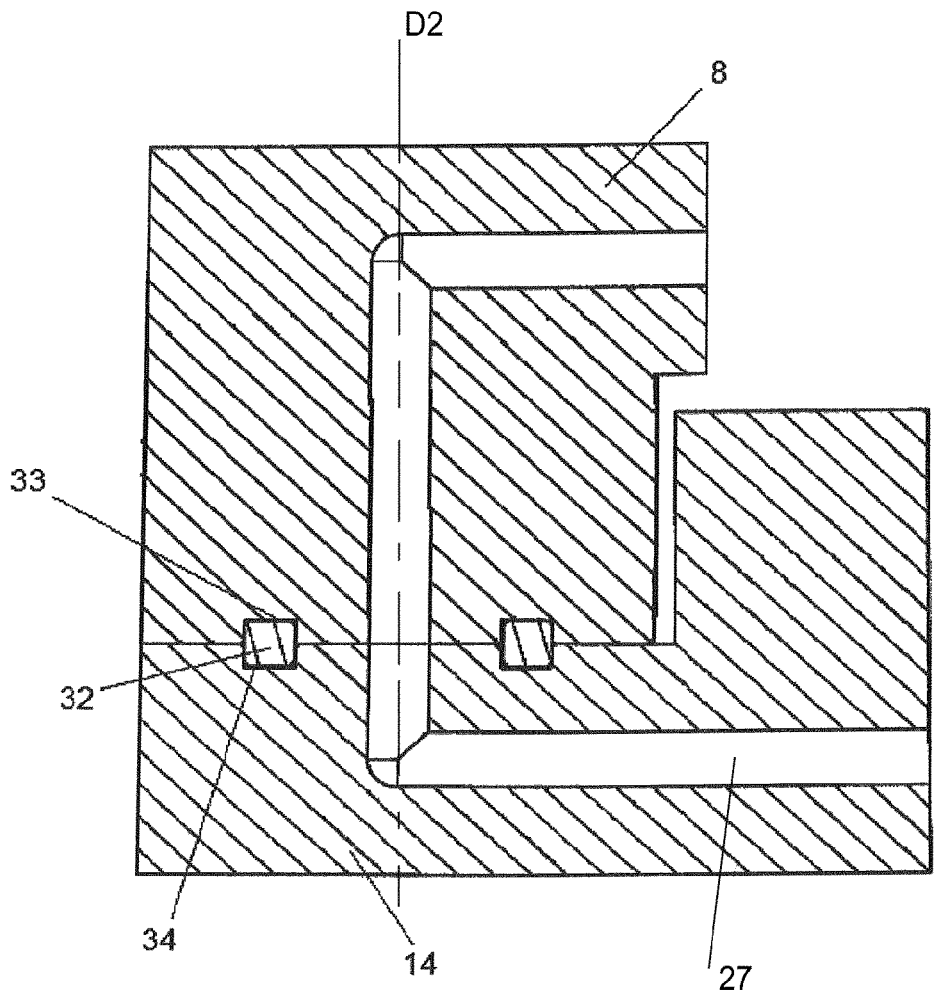
FIG. 17 shows a variant of the hot channel distributor arrangement of FIG. 12, wherein the auxiliary distributor arm is pivoted beneath the main distributor block.

The pivoting range of an auxiliary distributor arm about the rotational axis D2 on the main distributor arm is approximately 270° in this embodiment. In a special embodiment, the pivoting range of an auxiliary distributor arm can vary strongly. As a result of the length ratios of the distributor arms for example, the pivoting range can also be substantially smaller than 270°. It is also possible to achieve a pivoting range of up to 360° by constructional measures such as a joint configured at high altitude as shown in FIG. 17.

Figure 14:
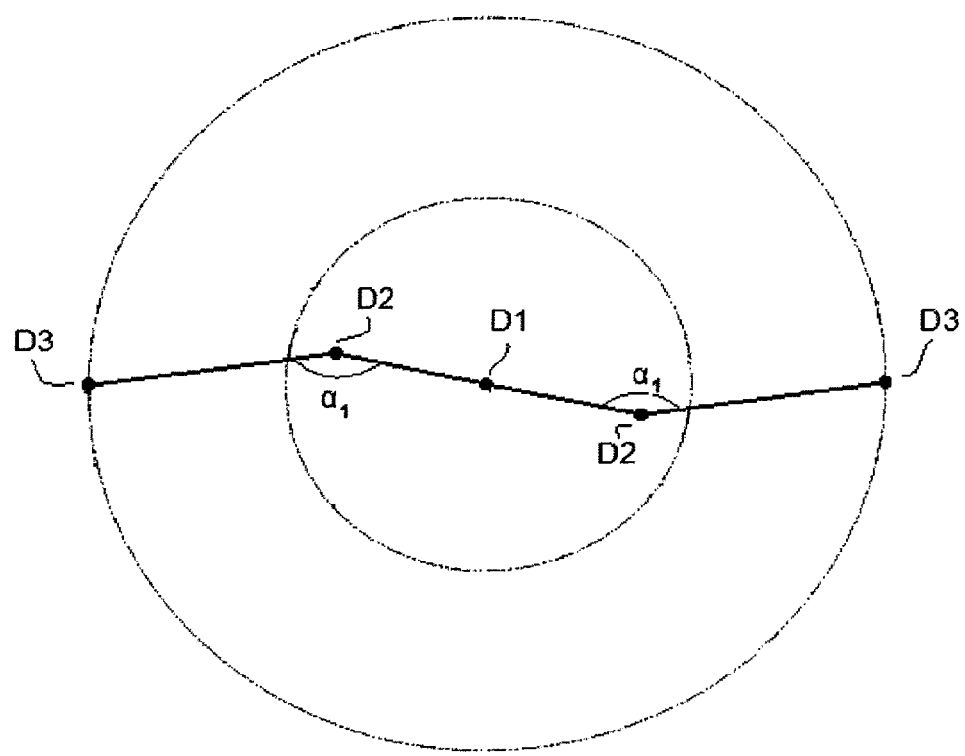
FIG. 14 shows a schematic view of the angular position between the main distributor block and the auxiliary distributor arm in the cold state.

FIG. 14 shows a possible schematic view of a hot channel distributor arrangement in the cold state, wherein the main distributor block and the auxiliary distributor arms are symbolically represented by lines, which connect the rotational axes (D1, D2, D3) to each other. The main distributor block is illustrated in this case by the connecting line of the rotational axes D2, D1 and D2. The auxiliary distributor arms are represented here by the connecting lines of the rotational axes D2, D3. As is shown in FIG. 14, the connecting lines form an angle α1. The rotational axes D1 and D3 may be substantially fixed spatially, so that they essentially only permit a rotation of the distributor blocks about their rotational axis. The rotational axes D2 are substantially not fixed spatially, so that not only a rotation of the main distributor block or auxiliary distributor arms is possible about the rotational axis D2, but also a spatial displacement of the rotational axis D2 by the thermal expansion of the main distributor block and the auxiliary distributor arms. All three rotational axes D1, D2 and D3 are arranged substantially parallel with respect to each other in this case, as a result of which the necessary mobility of the main distributor block and the auxiliary distributor arms is ensured during heating.

Figure 15:
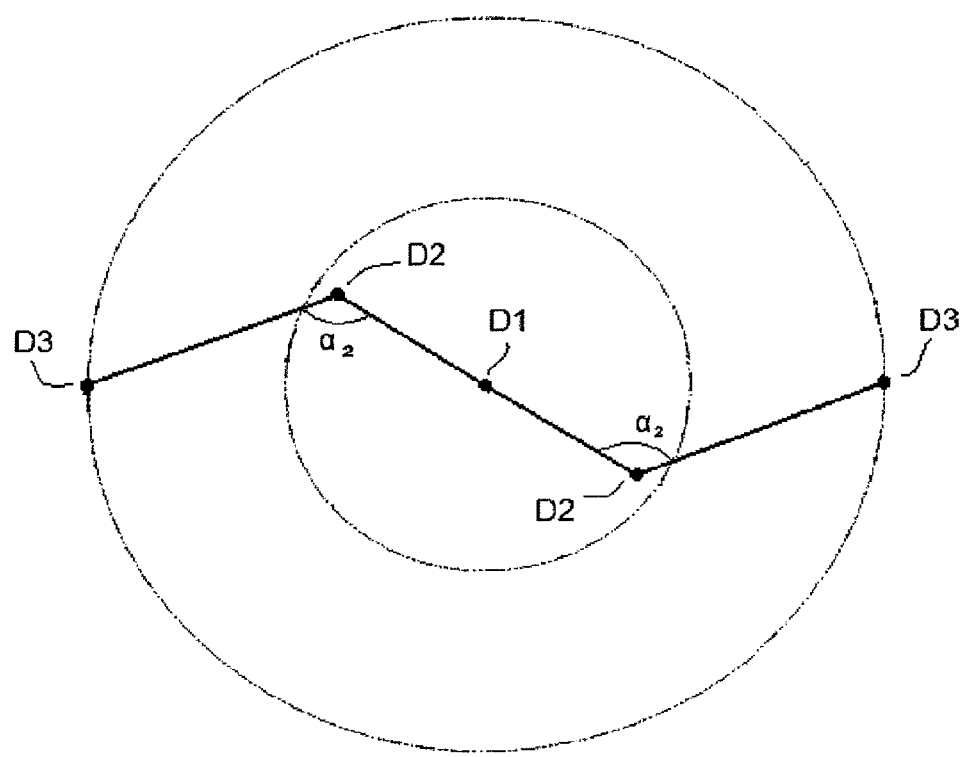
FIG. 15 shows a schematic view of the angular position between the main distributor block and the auxiliary distributor arm in the hot state.

FIG. 15 shows a possible schematic view of a hot channel distributor arrangement of FIG. 14 in the hot operating state. The illustration clearly shows that the rotational axis D2 is spatially displaced by the thermal expansion of the main distributor block and the auxiliary distributor arms. In addition to the spatial displacement of the rotational axis D2, the angle α2 is smaller in the hot operating state than the angle α1 in the cold state of the hot channel system.

As a result of the change in angle (α1 to α2) and the spatial displacement of the rotational axis D2, the tensions caused by the thermal expansion between the main distributor block, auxiliary distributor block and hot channel nozzle are minimized, which tensions usually occur in hot channel distributor arrangements which correspond to the state of the art.

As already described above, the sealing of the joints between the main distributor block and the auxiliary distributor arm can occur by clamping from a specific temperature which is usually lower than the operating temperature. Another configuration of the joint can be considered which does not require any clamping force for sealing the joint connection between the main distributor block and the auxiliary distributor arm, even if such an embodiment is not described here in closer detail.

Figure 16:
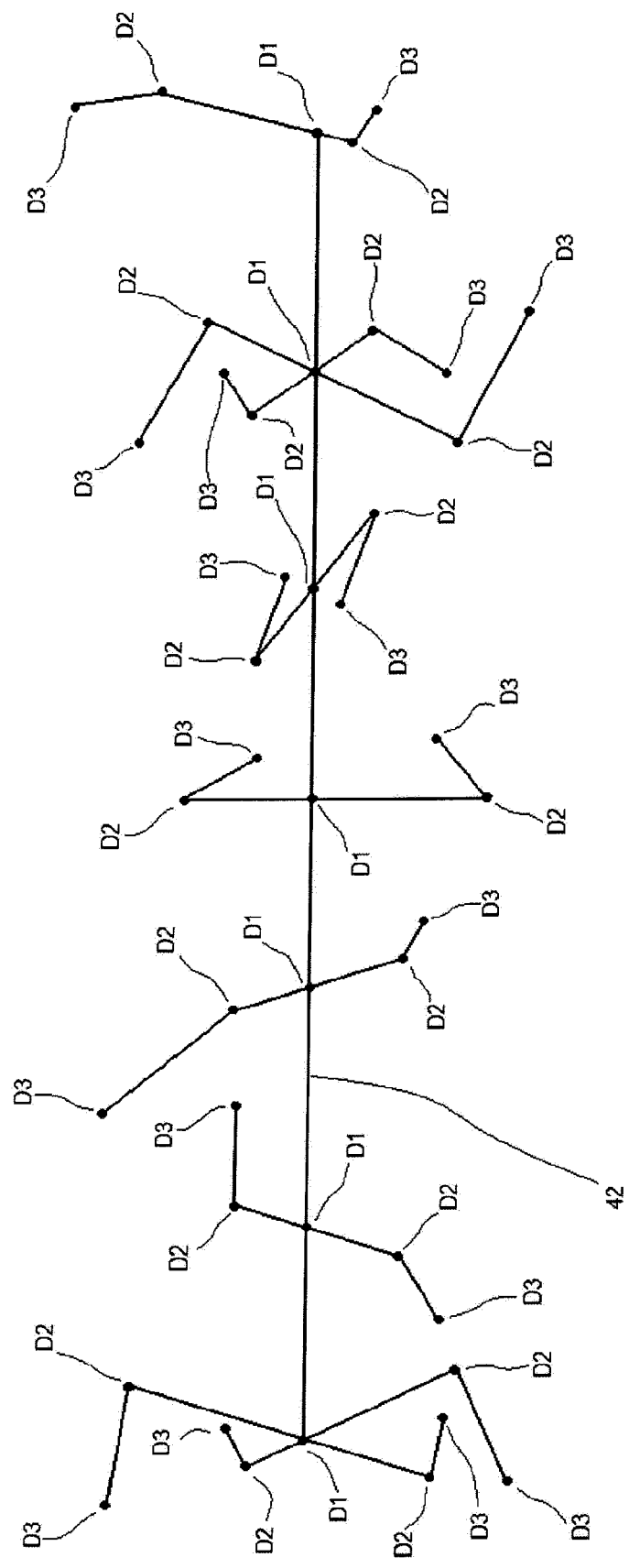
FIG. 16 shows a schematic view of a complex hot channel distributor arrangement.

FIG. 16 shows a possible schematic view of a complex hot channel distributor arrangement with different main distributor blocks and auxiliary distributor arms, which are shown in a simplified fashion in FIG. 14 and FIG. 15 by the connecting lines of the rotational axes D1, D2, D3.

The main distributor blocks are connected here to a supply block 42. Furthermore, the illustration shows a large variety of possibilities of angular positions and lengths of the main and auxiliary distributor arms. The schematic illustration shows clearly that both obtuse, right and acute angles can be combined with each other in various ways.

It is shown generally that the hot channel distributor arrangement can be used in a highly flexible way because it is not only possible to vary the nozzle distances but it is also possible to vary the hot channel distributor system virtually at will.

The invention claimed is:

1. A hot channel distributor arrangement for a hot channel system, which can be heated during a heating phase, and
which is designed to supply a plastic melt from a pour-in opening to at least two nozzle arrangements which can be moved relative to each other and independently of one another, each said nozzle arrangement having at least one outlet opening in the region of a nozzle body, comprising,
at least one main distributor block having at least two main distributor arms, said main distributor block being rotatable around a first rotational axis,
an auxiliary distributor block arranged on each arm of the at least one main distributor block, each said auxiliary distributor block forming at least one auxiliary distributor arm and being rotatable around a respective second rotational axis,
wherein an angle between the main distributor block and each auxiliary distributor block arranged thereon is adjustable,
wherein at least one of the nozzle arrangements is provided on each said auxiliary distributor arm, and
wherein the angle between the main distributor arm and at least one auxiliary distributor arm arranged thereon changes due to thermal expansion at least during the heating phase.

2. A hot channel distributor arrangement according to claim 1, comprising two or more main distributor blocks pivotable independently of each other and relative to each other.

3. A hot channel distributor arrangement according to claim 1, characterized in that both the first rotational axis of the main distributor block and the locations of melt outlets of the nozzle bodies of the at least two nozzle arrangements, but not the second rotational axes of the auxiliary distributor arms on the main distributor block, are fixed in a stationary manner relative to at least one die after adjustment of the positions of the main and auxiliary distributor blocks in the cold state of the hot channel system before heating of the hot channel system to the operating temperature required for injection.

4. A hot channel distributor arrangement according to claim 2, characterized in that each main distributor block comprises two main distributor arms which extend transversely to the first rotational axis towards opposite directions.

5. A hot channel distributor arrangement according to claim 4, characterized in that at least one of the auxiliary distributor arms is arranged on each of the main distributor arms.

6. A hot channel distributor arrangement according to claim 4, characterized in that the at least two main distributor arms are respectively pivotable around the first rotational axis.

7. A hot channel distributor arrangement according to claim 4, characterized in that a distributor section is placed centrally on the main distributor block between the ends of the main distributor arms thereof.

8. A hot channel distributor arrangement according to claim 1, characterized in that each of the auxiliary distributor arms can be pivoted around a respective second rotational axis on the main distributor arms.

9. A hot channel distributor arrangement according to claim 1, characterized in that the nozzle arrangements are arranged on respective ends of the auxiliary distributor arms.

10. A hot channel distributor arrangement according to claim 1, characterized in that the nozzle arrangements are respectively penetrated by a movable sealing needle.

11. A hot channel distributor arrangement according to claim 1, characterized in that each auxiliary distributor arm comprises one respective sleeve section.

12. A hot channel distributor arrangement according to claim 1, characterized in that sealing and/or centering means are arranged in a transitional or contact region of distributor channels between the main and auxiliary distributor arms.

13. A hot channel distributor arrangement according to claim 12, characterized in that the sealing and/or centering means comprises at least one of:
a melt guide sleeve placed between the main and auxiliary distributor arms in their contact region;
a sleeve-shaped projection formed on one of the main and auxiliary distributor arms, which projection engages in a respective recess of the other arm of the main and auxiliary distributor arms, and
a sealing ring arranged between at least one of the main and auxiliary distributor arms in their contact region.

14. A hot channel distributor arrangement according to claim 1, characterized in that one or several pressing elements are placed against the main and auxiliary distributor arms on either side of the joint regions between the main and auxiliary distributor arms, said pressing element or elements forming a flat contact surface and being arranged for contact on the die elements.

15. A hot channel distributor arrangement according to claim 1, wherein the first rotational axis is fixed with respect to at least one die, and each of the at least one auxiliary distributor arms respectively comprises a respective rotational axis in the axis of the nozzle body, so that each auxiliary distributor arm is rotatably fixed via the nozzle body in the at least one die.

16. A hot channel distributor arrangement according to claim 1, characterized in that the area of the potential positions of the nozzle arrangements which is defined or covered by the distributor arms has the shape of an annulus or graduated annulus.

17. A hot channel distributor arrangement according to claim 1, characterized in that the length of a melt channel of the associated nozzle body is equal in each position on the area irrespective of the distance between the hot channel nozzle and the pour-in opening.

18. A hot channel distributor arrangement according to claim 1, characterized in that the angle is always greater or lower than 180° in the operating state between main distributor arm and auxiliary distributor arm.

19. A hot channel distributor arrangement according to claim 1, characterized in that the hot channel distributor arrangement can be used for dies with different hot channel nozzle distances.

20. A hot channel distributor arrangement according to claim 1, characterized in that the relative position between the at least one main and auxiliary distributor arm is fixed in a clamping fashion merely in the heated operating state of the hot channel system by thermal expansion directly in the region of the second rotational axis.

21. A hot channel distributor arrangement according to claim 1, characterized in that the second rotational axis is displaced spatially by thermal expansion at least during the heating phase.

22. A hot channel distributor arrangement according to claim 1, characterized in that the angle is smaller in the hot operating state than in the cold state of the hot channel system.

23. A hot channel distributor arrangement according to claim 1, characterized in that the angle is smaller in the hot operating state than in the cold state of the hot channel system.

24. A hot channel distributor arrangement for a hot channel system, which can be heated during a heating phase, and
which is designed to supply a plastic melt from a pour-in opening to at least two nozzle arrangements which can be moved relative to each other and independently of one another, each said nozzle arrangement having at least one outlet opening in the region of a nozzle body, comprising,
at least one main distributor block having at least one main distributor arm, said main distributor block being rotatable around a first rotational axis,
at least one auxiliary distributor block arranged on the at least one main distributor block, each said auxiliary distributor block forming at least one auxiliary distributor arm and being rotatable around a respective second rotational axis,
wherein an angle between the main distributor block and each auxiliary distributor block arranged thereon is adjustable,
wherein at least one of the nozzle arrangements is provided on each said auxiliary distributor arm,
wherein the angle between the main distributor arm and at least one auxiliary distributor arm arranged thereon changes due to thermal expansion at least during the heating phase; and
wherein the rotational axes are arranged substantially parallel with respect to each other.

25. A hot channel distributor arrangement according to claim 1, characterized in that the angle of the main distributor block to the auxiliary distributor arm can be an obtuse, right, or acute angle.

26. The hot channel distributor arrangement according to claim 8 wherein the respective second rotational axes of the main distributor arms are in the end regions of the main distributor arms.

27. The hot channel distributor arrangement according to claim 14 wherein the one or several pressing elements comprise one or several respective rings.

* * * * *